US011658735B1

(12) United States Patent
Karppanen

(10) Patent No.: US 11,658,735 B1
(45) Date of Patent: May 23, 2023

(54) SYSTEM FOR COLLABORATIVE CONSTELLATION MANAGEMENT INTERFACE

(71) Applicant: AMAZON TECHNOLOGIES, INC., Seattle, WA (US)

(72) Inventor: Jari Karppanen, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/456,048

(22) Filed: Nov. 22, 2021

(51) Int. Cl.
*H04B 7/185* (2006.01)
*H04W 12/06* (2021.01)

(52) U.S. Cl.
CPC ..... *H04B 7/18589* (2013.01); *H04B 7/18584* (2013.01); *H04W 12/06* (2013.01)

(58) Field of Classification Search
CPC ................ H04B 7/18589; H04B 7/18584; H04W 12/06
See application file for complete search history.

(56) References Cited

U.S. PATENT DOCUMENTS

| | | | | |
|---|---|---|---|---|
| 4,193,131 | A * | 3/1980 | Lennon | G07F 7/1016 380/284 |
| 9,813,904 | B2 * | 11/2017 | Cardone | G06F 21/35 |
| 10,380,814 | B1 * | 8/2019 | Mathiesen | G07C 9/253 |
| 10,432,299 | B2 * | 10/2019 | Ravishankar | H04B 7/18528 |
| 10,445,593 | B1 * | 10/2019 | Mathiesen | G06T 7/292 |
| 11,521,170 | B1 * | 12/2022 | Thurston | G06Q 30/0633 |
| 11,528,233 | B2 * | 12/2022 | Shear | H04L 47/70 |
| 2003/0217165 | A1 * | 11/2003 | Buch | H04L 63/0823 709/229 |
| 2006/0030261 | A1 * | 2/2006 | Taur | H04B 7/18519 455/406 |
| 2009/0177778 | A1 * | 7/2009 | Turk | H04L 67/568 709/227 |

(Continued)

OTHER PUBLICATIONS

"Citrix Workspace Browser", 11 pages, Oct. 20, 2021. Retrieved from the Internet: URL: https://docs.citrix.com/en-us/citrix-workspace-app/citrix-workspace-browser.html.

(Continued)

*Primary Examiner* — Dominic E Rego
(74) *Attorney, Agent, or Firm* — Lindauer Law, PLLC

(57) ABSTRACT

A constellation of many satellites provides communication between devices such as user terminals and ground stations. A collaborative constellation management interface (CCMI) provides collaborative interaction capabilities to operators at different locations, facilitating management and operation of the constellation. A lightweight presentation client, such as a browser, handles receiving input data from an operator and presenting output data to the operator. An operator initiates a session that participates in a common session. Limited to the permissions associated with the operator's session, input data is processed by the systems referred to by the common session. Output data for presentation is sent to the participating operator sessions, limited to their respective permissions. As a result, each common session accepts input and presents consistent output, allowing for collaborative interaction by many operators at different locations. Input and output data may be stored for later use, review, and so forth.

20 Claims, 7 Drawing Sheets

(56) References Cited

U.S. PATENT DOCUMENTS

| | | | |
|---|---|---|---|
| 2014/0181968 A1* | 6/2014 | Ge | H04L 63/1416 |
| | | | 726/23 |
| 2016/0248785 A1* | 8/2016 | Petry | H04L 67/1097 |
| 2018/0062737 A1* | 3/2018 | Wyler | H04B 7/18521 |
| 2019/0281052 A1* | 9/2019 | Lekkas | H04L 9/14 |
| 2019/0364496 A1* | 11/2019 | Jin | H04M 15/66 |
| 2020/0228561 A1* | 7/2020 | Petry | G06F 21/53 |
| 2020/0313756 A1* | 10/2020 | Prinz | H04B 7/18513 |
| 2022/0116404 A1* | 4/2022 | Manasse | H04L 67/60 |
| 2022/0132358 A1* | 4/2022 | Peng | H04W 28/0289 |
| 2022/0244344 A1* | 8/2022 | Bao | G01S 5/0289 |
| 2022/0345210 A1* | 10/2022 | Palermo | H04B 7/18584 |

OTHER PUBLICATIONS

"Model-view-viewmodel", Wikipedia, 5 pages. Retrieved from the Internet on Nov. 8, 2021. URL: https://en.wikipedia.org/wiki/Model%E2%80%93view%E2%80%93viewmodel.

Likness, Jeremy, "Model-View-ViewModel (MVVM) Explained", Aug. 8, 2010, 19 pages, CodeProject. Retrieved from the Internet: URL: https://www.codeproject.com/articles/100175/model-view-viewmodel-mvvm-explained.

* cited by examiner

US 11,658,735 B1

SYSTEM FOR COLLABORATIVE CONSTELLATION MANAGEMENT INTERFACE

BACKGROUND

A constellation of a large number of satellites, and the payloads carried by those satellites, may be used to provide various services. The constellation is managed to maintain safety and efficacy.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
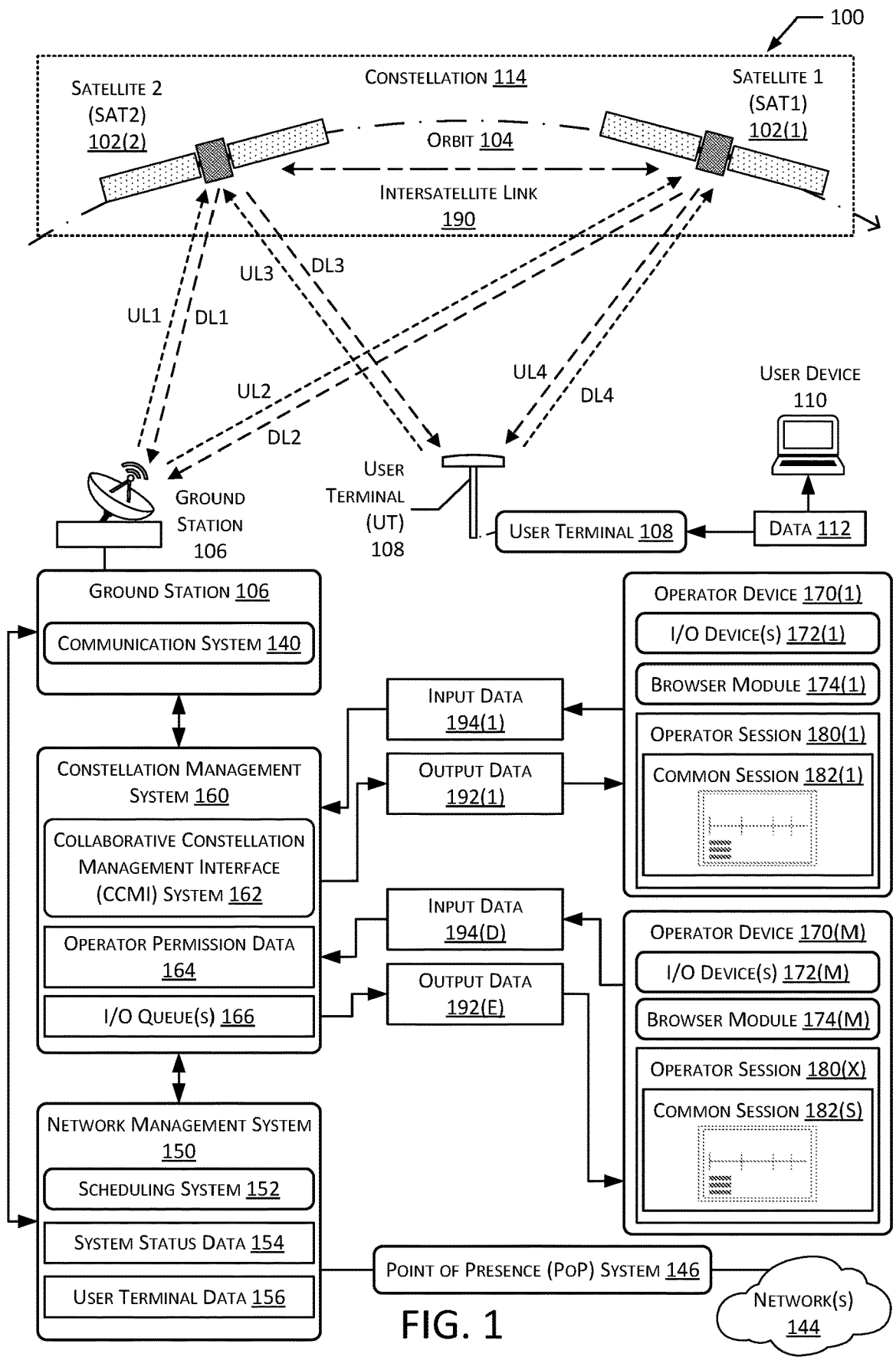
FIG. 1 illustrates a system that utilizes a constellation management system (CMS) with a collaborative constellation management interface (CCMI) to facilitate collaborative management of a constellation of satellites, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A constellation of many satellites may be used to provide a wide variety of useful services. For example, a communication system may utilize satellites in the constellation to wirelessly transfer data between user terminals and ground stations that in turn connect to other networks, such as the Internet. In another example, a remote sensing system may utilize satellites in a constellation to acquire remote sensing data for weather forecasting or terrestrial resource management.

Traditionally, operators of individual satellites have manually managed their satellites in a centralized location, often implemented as a large "mission control" room where human operators gather to work collaboratively. However, this collaborative model that relies on physical proximity does not scale well, and rapidly becomes infeasible as the number of satellites managed increases. For example, while traditional organizations may be able to manually manage a relatively small constellation of 70 satellites with a group of people in a room, managing 7000 satellites in such fashion is infeasible and may adversely impact safety and efficiency of the constellation as well as other resources that are in orbit.

Collaborative operation that is focused on a central physical location also introduces a single point of failure. For example, operations of the traditional mission control may be curtailed or stopped in the event of a power outage at the mission control facility, failure of the communications at the mission control facility, closure due to health regulations, and so forth.

Described in this disclosure is a constellation management system (CMS) that includes a collaborative constellation management interface (CCMI) that facilitates operation of satellite constellations. The CCMI allows operators to securely participate from a wide variety of physical locations, using a wide variety of devices. The CCMI provides a common session for operators to collaborate by sharing a common view of information and common input of commands. For example, one operator may change a date range for a timeline, and that change results in all participating operators having the presentation of the same date range. Different operators may be assigned different permissions to allow them to see particular information, to view only, or to modify the common session.

The CCMI provides an intermediary between the operator device used by an operator and the other systems of the CMS, such as flight dynamics, satellite main control, and so forth. The CCMI allows for the operator interface to be updated without affecting the underlying systems. For example, as new flight dynamics functions become available or upgraded, they may be quickly incorporated into CCMI. In another example, the CCMI may provide access to a training system, simulator system, and so forth.

The CCMI supports a thin presentation layer on operator devices, with a common session being available to many operator sessions. The common session is associated with management of incoming input data from participating operator sessions, sending requests to underlying CMS systems, receiving responses from those underlying CMS systems, generating output data based on those responses, and distributing that output data to the participating operator sessions.

Within the common session, object identifiers (IDs) are used to refer to specific functions that are provided by other underlying systems of the CMS. For example, a common session may include an object ID that refers to a function that shows a trajectory for a specified set of satellites. The same object ID may be used in different common sessions, improving performance by reducing redundancy in processing and data transmission.

An operator session provides a view or input/output interface to an operator. The operator session may be instantiated using a web browser executing on a computing device. An operator session may participate in one or more common sessions. Similarly, an individual operator may use a plurality of operator sessions, such as having different operator sessions open in different web browser tabs.

Permissions may be applied to constrain operation of the common session. These permissions may be applied with varying levels of granularity to one or more of input or output. Permissions may be associated with particular operator accounts. For example, a first operator may have "view only" permissions allowing them to see any common session but not make changes to operate the common session. In another example, a second operator may have "modify" permissions allowing them to both see and modify any common session. Permissions may be associated with particular common sessions, specifying the permissions associated with particular operator accounts for a specified common session.

Permissions may also specify a level of data that is permitted to be presented to a common session, or limit to individual participating operator sessions within that common session. For example, the common session may provide comprehensive status about the constellation, within which a first operator session is permitted access to information such as fuel state of individual satellites while a second operator session omits this information.

The permissions may be used to filter inputs received from operator sessions. For example, input data received from a first operator session associated with an operator account having "view only" permissions may be disregarded. In comparison, input data received from a second operator session associated with an operator account having "modify" permissions may be processed. Similarly, output data may be filtered according to the permissions associated with respective operator sessions.

Many operators with corresponding permissions may be providing input data to the same common session. In some implementations the input data may be ranked. For example, some operator accounts may have a higher rank or priority relative to others. The higher ranked input data may be processed, while the lower ranked input data is disregarded.

The output data sent to operator sessions may be used to modify document object model (DOM) data stored on the operator device. In some implementations, a change in the DOM data may be followed by a re-rendering of the DOM to produce output that is then presented by the operator device.

The CCMI is bandwidth efficient, using less bandwidth during operation than other techniques. For example, the data size of the input data and the output data is less than a video stream of a shared graphical user interface.

An operator session that temporarily loses communication with the group session may "catch up" by receiving missed output data and subsequently updating the DOM data according to that missed output data. In a similar fashion, an operator session that joins a group session that is in progress may be sent output data, according to their permissions, which is subsequently used to update the DOM data of the operator session.

In some implementations, timestamp data may be included in the output data. Session data may be stored that includes the output data and the associated timestamps. This session data may then be "replayed" at a later time for assessment, training, or other purposes, presenting the output in a replay session in the order and timing of actual occurrence.

The CCMI allows for improved collaboration, which reduces the capital costs associated with the constellation by improving usage of resources onboard the satellite, such as battery systems and maneuvering systems. For example, the CCMI may be used to coordinate activities that use various resources onboard individual satellites to avoid depleting the battery and propellant of satellites that are being reallocated. As a result, operational life of the individual satellite may be extended, reducing the need for replacement or refurbishment.

By using the techniques described in this disclosure, safe and effective management of a constellation using many operators in different physical locations is possible. Operators may participate in one or more common sessions, each presenting consistent information to participating operators subject to their individual permissions. Operators with appropriate permissions may interact with a common session, such as changing information being presented in the common session, with those changes subsequently being presented to other participants of the common session.

Illustrative System

A constellation of satellites may be used to provide a wide variety of useful services. For example, a constellation of satellites may include sensors to acquire remote sensing data to facilitate terrestrial resource management. In another example, a constellation of satellites may provide communication services. The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication services. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because the period of the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication services also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the satellite at 600 km only introduces 4 ms of latency for a single hop. The lower altitude also reduces the distance the electromagnetic signal has to travel. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation" 114) of artificial satellites 102(1), 102(2), . . . , 102(S), each satellite 102 being in orbit 104 around a body such as the Earth, moon, sun, and so forth. Also shown is a ground station 106, user terminal (UT) 108, a user device 110, and so forth.

The constellation 114 may comprise hundreds or thousands of satellites 102, in various orbits 104. For example, one or more of these satellites 102 may be in non-geosynchronous orbits (NGOs) in which they are in constant motion with respect to the Earth, such as a low earth orbit (LEO). In this illustration, orbit 104 is depicted with an arc pointed to the right. A first satellite (SAT1) 102(1) is leading (ahead of) a second satellite (SAT2) 102(2) in the orbit 104.

One or more ground stations 106 comprise facilities that are in communication with one or more satellites 102. The ground stations 106 may pass data between the satellites 102, a network management system 150, networks such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground station 106 may also be connected to one or more communication networks. For example, the ground station 106 may connect to a terrestrial fiber optic communication network. The ground station 106 may act as a network gateway, passing user data or other data between the one or more communication networks and the satellites 102. Such data may be processed by the ground station 106 and communicated via the communication system 140. The communication system 140 of a ground station 106 may include components similar to those of the communication system of a satellite 102 and may perform similar communication functionalities. For example, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

The satellites 102 are in communication with a constellation management system (CMS) 160 that includes a collaborative constellation management interface (CCMI) system 162 that facilitates management of the satellites 102 in the constellation 114. The CCMI system 162 may be used to coordinate and direct operation of the satellites 102 in the constellation 114 as implemented through the other systems of the CMS 160. For example, the CCMI system 162 may be used to present information to operators about satellites 102 in their assigned orbits 104, receive instructions from operators to initiate maintenance activities onboard the satellites 102, receive instructions from operators to prevent a payload on a satellite 102 from interfering with another satellite 102, and so forth.

Operators (not shown) may use operator devices 170(1), 170(2), . . . , 170(M) to interact with the CCMI system 162. The operator devices 170 comprise computing devices such as desktop computers, laptop computers, tablet computers, and so forth. Each operator device 170 may include one or more I/O devices 172 such as a keyboard and mouse for input and a display device for output. Each operator device 170 also executes a client application, such as a browser module 174. For example, the browser module 174 may comprise a web browser that is executed by the operator device 170.

During operation of the CCMI system 162, one or more common sessions 182(1), 182(2), . . . , 182(S) are instantiated. A common session 182 provides a collaborative workspace for participating operator sessions 180(1) 180(2), . . . , 180(X). A common session 182 receives input data 194 from operator sessions 180 and provides output data 192 to operator sessions 180.

The CCMI system 162 may include or have access to operator permission data 164. The operator permission data 164 may specify permissions that are associated with a particular operator's account. For example, permissions may specify a particular namespace that an operator has access to, what information the operator is allowed to view, what actions the operator is allowed to take with regard to a common session 182, what actions the operator is allowed to take with regard to the constellation 114, and so forth.

The constellation 114 may be divided into one or more namespaces. The one or more namespaces may be associated with a common session 182, the objects within the common session 182, an operator session 180, the objects within the operator session 180, and so forth. Each namespace may be associated with at least a portion of the constellation 114 or elements of the constellation 114 or the supporting infrastructure. For example, a namespace "entire_system" may include all satellites 102, ground stations 106, the user terminal 108, and so forth. In other examples, a "space_segment" namespace may include all satellites 102, a "ground_segment" namespace may include ground stations 106, and so forth. In yet another example, a namespace may specify a particular set of satellites 102 in the constellation 114. For example, a set of satellites 102 sharing a common orbital inclination may be associated with a common namespace such as "inclination_47". In implementations where a particular namespace is associated with a common session 182, the objects associated with that common session 182 may be filtered or otherwise limited to information about entities within that namespace. Continuing the earlier example, a common session 182 that is associated with the "incliniation_47" would present information about the set of satellites 102 specified by that namespace.

The handling of the input data 194 and output data 192 may be managed using input/output (I/O) queues 166. This may include filtering input data 194, output data 192, or both based on operator permission data 164 that is associated with a particular operator session 180.

The common session 182 may comprise a set of data processing objects that may receive input data 194 from operator sessions 180, interact with other systems in the CMS 160, and send output data 192 to respective operator sessions 180. This is discussed in more detail with regard to FIGS. 5-7. The common session 182 may have one or more associated operator sessions 180(1)-(X).

The operator session 180 may be associated with the operator permission data 164 as mentioned above. For example, an operator may authenticate their operator account in order to access their operator device 170 and instantiate an operator session 180 with the CCMI system 162. Once authenticated, the operator permission data 164 associated the operator account may be subsequently used to specify the permissions associated with a particular operator session 180.

In some implementations, an operator session 180 may correspond to a tab in a web browser application. A single operator may have, using their browser module 174, a plurality of different operator sessions 180 in use at a given time. The browser module 174 facilitates the use of a thin presentation layer. In some implementations, the browser module 174 may use a document object model (DOM) to store information for rendering and presentation using an output device, such as a display device. The output data 192 received from the CCMI system 162 may result in changes to the DOM in the browser module 174. As a result of the changes, the DOM may be used to determine output to be presented using the display device.

An operator session 180 may participate in one or more common sessions 182. For example, operator session 180(3) (not shown) may be participating in common session 182(1) and common session 182(3) (not shown). This is discussed in more detail with regard to FIG. 5.

By using the CCMI system 162, operators may utilize a common collaborative workspace to maintain the constellation 114. According to their respective permissions, operators are able to view information in the common session 182 and interact with the common session 182. For example, a first operator may add a new object to the common session 182 to display space weather information. To the extent permissions permit, the resulting output data 192 is distributed to the participating operator sessions 180. Similarly, if a second operator changes a date range in an object presenting a timeline, all participating operator sessions 180 would then be presented the timeline with the changed date range.

The CMS 160 may comprise one or more servers or other computing devices. Operation of the CMS 160 is discussed in more detail with regard to FIG. 3.

The ground stations 106 are in communication with a network management system 150 that may include a scheduling system 152. The network management system 150 is also in communication, via the ground stations 106, with the satellites 102 and the UTs 108. The network management system 150 coordinates operation of the ground stations 106, UTs 108, and other resources of the system 100. The network management system 150 may interact with the CMS 160 during operation. The network management system 150 may comprise one or more servers or other computing devices.

The scheduling system 152 schedules resources to provide communication to the UTs 108. For example, the scheduling system 152 may determine handover data that indicates when communication is to be transferred from the first satellite 102(1) to the second satellite 102(2). Continuing the example, the scheduling system 152 may also specify communication parameters such as frequency, timeslot, and so forth. During operation, the scheduling system 152 may use information such as ephemeris data from the CMS 160, system status data 154, user terminal data 156, and so forth.

The system status data 154 may comprise information such as which UTs 108 are currently transferring data, satellite availability, current satellites 102 in use by respective UTs 108, capacity available at particular ground stations 106, diagnostic information, and so forth. For example, the satellite availability may comprise information indicative of satellites 102 that are available to provide communication service or those satellites 102 that are unavailable for communication service. Continuing the example, the CMS 160 may indicate that a satellite 102 is unavailable due to malfunction, previous tasking, maneuvering, and so forth. The communication system status data 154 may be indicative of past status, predictions of future status, and so forth. For example, the communication system status data 154 may include information such as projected data traffic for a specified interval of time based on previous transfers of user data. In another example, the communication system status data 154 may be indicative of future status, such as a satellite 102 being unavailable to provide communication service due to scheduled maneuvering, scheduled maintenance, scheduled decommissioning, and so forth.

The user terminal data 156 may comprise information such as a location of a particular UT 108. The user terminal data 156 may also include other information such as a priority assigned to user data associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The UT 108 includes a communication system to establish communication with one or more satellites 102. For example, the communication system may include one or more modems, digital signal processors, power amplifiers, antennas (including at least one antenna that implements multiple antenna elements, such as a phased array antenna), processors, memories, storage devices, communications peripherals, interface buses, and so forth. The UT 108 passes communication system status data 154 between the constellation 114 of satellites 102 and the user device 110. The data 112 may include data originated by the user device 110 (upstream data) or data addressed to the user device 110 (downstream data).

The UT 108 may be fixed or in motion. For example, the UT 108 may be used at a residence or on a vehicle such as a car, boat, aerostat, drone, airplane, and so forth. The UT 108 includes a tracking system. The tracking system uses almanac data to determine tracking data. The almanac data provides information indicative of orbital elements of the orbit 104 of one or more satellites 102. For example, the CMS 160 may generate almanac data that comprises orbital elements such as "two-line element" data for the satellites 102 in the constellation 114. The almanac data may be broadcast or otherwise sent to the UTs 108 using the communication system.

The tracking system may use the current location of the UT 108 and the almanac data to determine the tracking data for the satellite 102. For example, based on the current location of the UT 108 and the predicted position and movement of the satellites 102, the tracking system is able to calculate the tracking data. The tracking data may include information indicative of azimuth, elevation, distance to the second satellite, time of flight correction, or other information associated with a specified time. The determination of the tracking data may be ongoing. For example, the first UT 108 may determine tracking data every 100 ms, every second, every five seconds, or at other intervals.

With regard to FIG. 1, an uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106. The satellites 102 may also be in communication with one another. For example, an intersatellite link (ISL) 190 provides for communication between satellites 102 in the constellation 114.

A device, such as a server, uses one or more networks 144 to send downstream data 112 that is addressed to a UT 108 or a user device 110 that is connected to the UT 108. The system 100 may include one or more point of presence (PoP) systems 146. Each PoP system 146 may comprise one or more servers or other computing devices at a facility, such as on Earth. Separate PoP systems 146 may be located at different locations in different facilities. In one implementation, a PoP system 146 may be associated with providing service to a plurality of UTs 108 that are located in a particular geographic region.

In this illustration, a first PoP system 146 at a facility accepts the data 112 addressed to the UT 108 and proceeds to attempt delivery of the data 112 to the UT 108. The PoP system 146 is in communication with one or more ground stations 106(1), 106(2), . . . , 106(G) and the network management system 150. In some implementations, one or more functions may be combined. For example, the PoP system 146 may perform one or more functions of the network management system 150. In another example, the PoP system 146 may include an integrated ground station 106.

The PoP system 146 may provide several functions including determining timeslot and communication resources, generating preshaped data, and so forth. One function is to assign a targeted timeslot to the downstream data 112. For example, scheduling handoffs of UTs 108 from one satellite 102 to another may be scheduled on 5-second intervals. The targeted timeslot may indicate a particular 5-second interval within which the downstream data 112 is expected to be delivered. The targeted timeslot may already be in progress. For example, the targeted timeslot assigned to the downstream data 112 may have begun 3 seconds before the downstream data 112 was received.

The PoP system 146 determines the UT 108 that the downstream data 112 is addressed to and determines first communication resource data. The first communication resource data specifies the communication resources, such as ground station 106, uplink modem at the ground station 106, satellite 102, downlink modem on the satellite 102, and so forth that would result in delivery of the downstream data 112 to the UT 108. The downstream data 112 may comprise a single packet or other unit of data transfer, or a plurality of packets or other units of data transfer that are associated with delivery to the particular UT 108.

The satellite 102, the ground station 106, the user terminal 108, the user device 110, the network management system 150, the CMS 160, or other systems described herein may include clocks. These clocks may be synchronized to a common source. In some implementations, the clock may be a global positioning system (GPS) disciplined clock or an atomic clock that provides a high accuracy and high precision time source. Output from the clock may be used to coordinate operation of the system 100.

Various configurations of the systems described in this disclosure may be used. For example, the CMS 160 may be implemented using computing devices located in a plurality of data centers with operators using the CCMI system 162 to operate the system 100 from a plurality of physical locations, to improve reliability and system availability.

The satellite 102, the ground station 106, the user terminal 108, the user device 110, the PoP system 146, the network management system 150, the CMS 160, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 2:
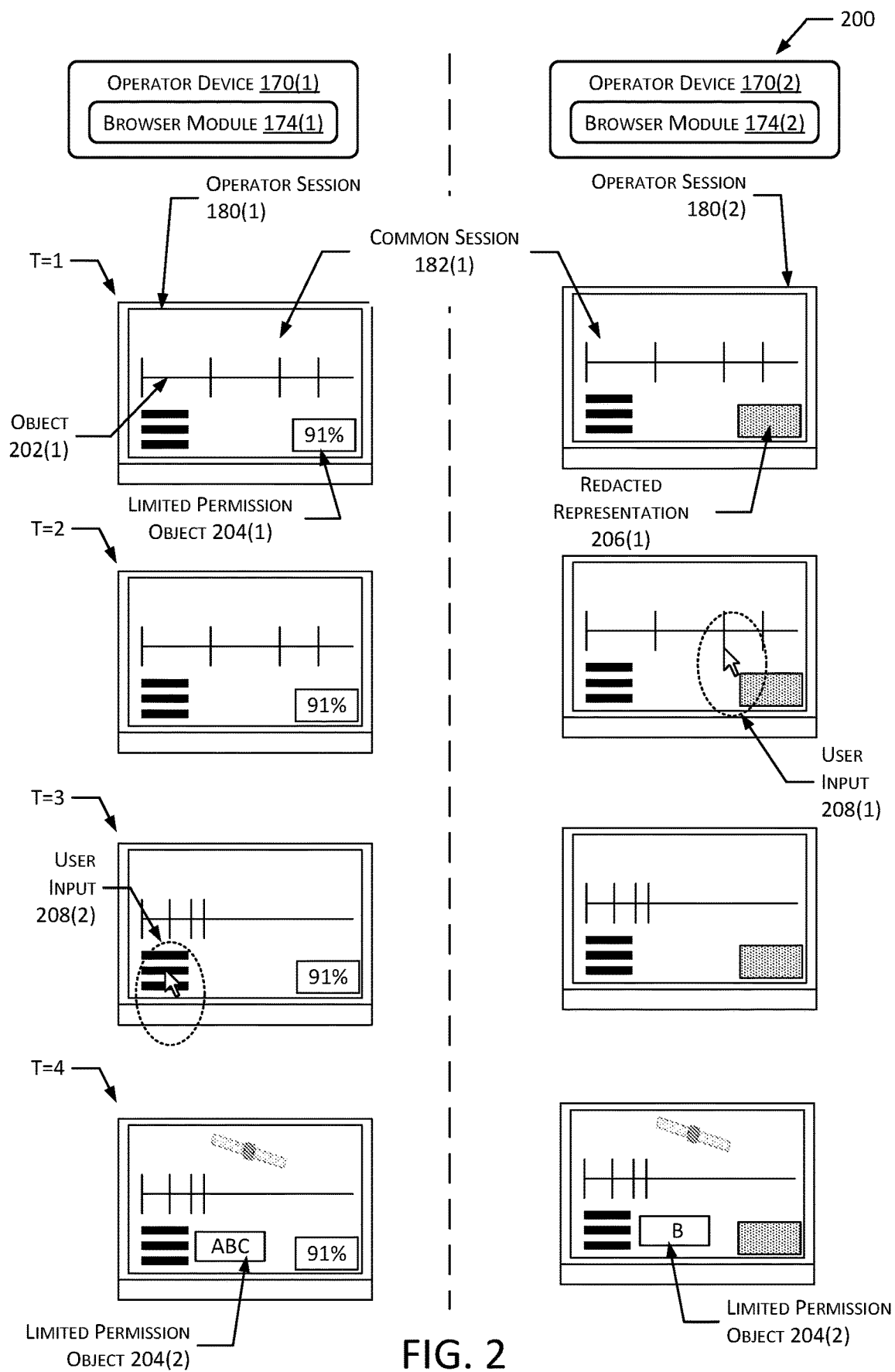
FIG. 2 illustrates a common session provided by a CCMI, according to some implementations.

FIG. 2 illustrates at 200 a common session 182(1) provided by a CCMI system 162, according to some implementations. In this illustration a first operator device 170(1) associated with a first operator is shown on a left side, and a second operator device 170(2) associated with a second operator is shown on a right side. The first operator device 170(1) and the second operator device 170(2) are participating in a first common session 182(1) provided by the CCMI system 162, presented in their respective browser modules 174(1) and 174(2).

In this illustration, the first operator session 180(1) is associated with a first operator who has access to all available information. The second operator session 180(2) is associated with a second operator who has limited access to available information.

At time T=1 both operator devices 170 are showing user interfaces associated with the first common session 182(1). The first common session 182(1) includes a plurality of objects 202 that are presented as elements of the interface. The first common session 182(1) may include limited permission objects 204. Limited permission objects 204 are objects 202 for which associated permissions limit their presentation in particular operator sessions 180. For example, the first operator session 180(1) depicts the first limited permission object 204(1) showing a value of "91%", while the second operator session 180(2) does not. In the implementation depicted here, for operator sessions 180 that do not have permission to access the limited permission object 204(1), a redacted representation 206(1) may be presented instead. For example, the redacted representation 206 may comprise a shaded box that indicates "not available to this operator" or other indicia.

The objects 202 may include various representations such as timelines, charts, graphs, images, tabular data, input fields, controls to provide input, and so forth. Consistent with the operator permission data 164, participating operator sessions 180 may operate the common session 182. For example, input from either the first operator or the second operator may change the objects 202 or presentation of objects 202 in the common session 182(1).

At time T=2, the second operator uses the browser module 174(2) executing on the second operator device 170(2) to provide user input 208(1). The user input 208(1) changes presentation of object 202(1) that depicts a timeline of operations associated with the constellation 114. For example, the second operator may click and drag the timeline to change the range of time presented, with the user input 208(1) comprising information about this interaction. The second browser module 174(2) sends this first input data 194(1) to the CCMI system 162. After determining that the second operator session 180(2) is permitted to make this change, the first input data 194(1) is processed. As a result, the CCMI system 162 determines first output data 192(1). This first output data 192(1) is provided to the first common session 182(1), and is sent to the participating first operator session 180(1) and the second operator session 180(2).

At time T=3, responsive to at least a portion of the first output data 192(1), the user interfaces presented by the operator devices 170(1)-(2) are now presenting the timeline consistent with the user input 208(1). As a result, operators participating in the first common session 182(1) are seeing the same representation of the timeline object 202(1). As mentioned above, the common session 182(1) may include limited permission objects 204(1). As a result, in some implementations, the user interfaces presented to the various operators may differ in some details consistent with the permissions assigned to those operators. Also at T=3, the first operator provides second user input 208(2), selecting a second limited permission object 204(2) to be presented.

At T=4, responsive to the user input 208(2), the CCMI system 162 has provided output data 192 to cause presentation of the second limited permission object 204(2). As a result of the permissions associated with the operator sessions 180, the first operator session 180(1) is able to see the entirety of the information available from the second limited permission object 204(2), such as "ABC". In comparison, the second operator session 180(2) has permission to see only a subset of the information available from the second limited permission object 204(2), such as "B".

In other implementations, some user input 208 may result in changes that are specific to a particular operator session 180. For example, a particular operator may specify a particular color scheme that is then used for their respective operator session 180. Continuing the example, an operator who has difficult seeing yellow highlight may specify that a cyan highlight is to be used. Objects 202, permissions, and so forth, are discussed in more detail with respect to the following figures, in particular FIGS. 5-7.

The operator session(s) 180 may present information indicative of delayed, missing, or expired data. For example, the operator session 180 may present a flag or other indicia that is indicative of expired data.

The operator session(s) 180 may comprise additional controls. For example, a "pause" control may be presented that, when activated, suspends receiving and processing output data 192 or a portion thereof at the browser module 174. In another example, a "replay" control may be presented that, when activated, submits previously received output data 192 to the browser module 174. Other controls, such as a "resume" to continue processing output data 192 after a "pause" may also be presented in the operator session 180.

Figure 3:
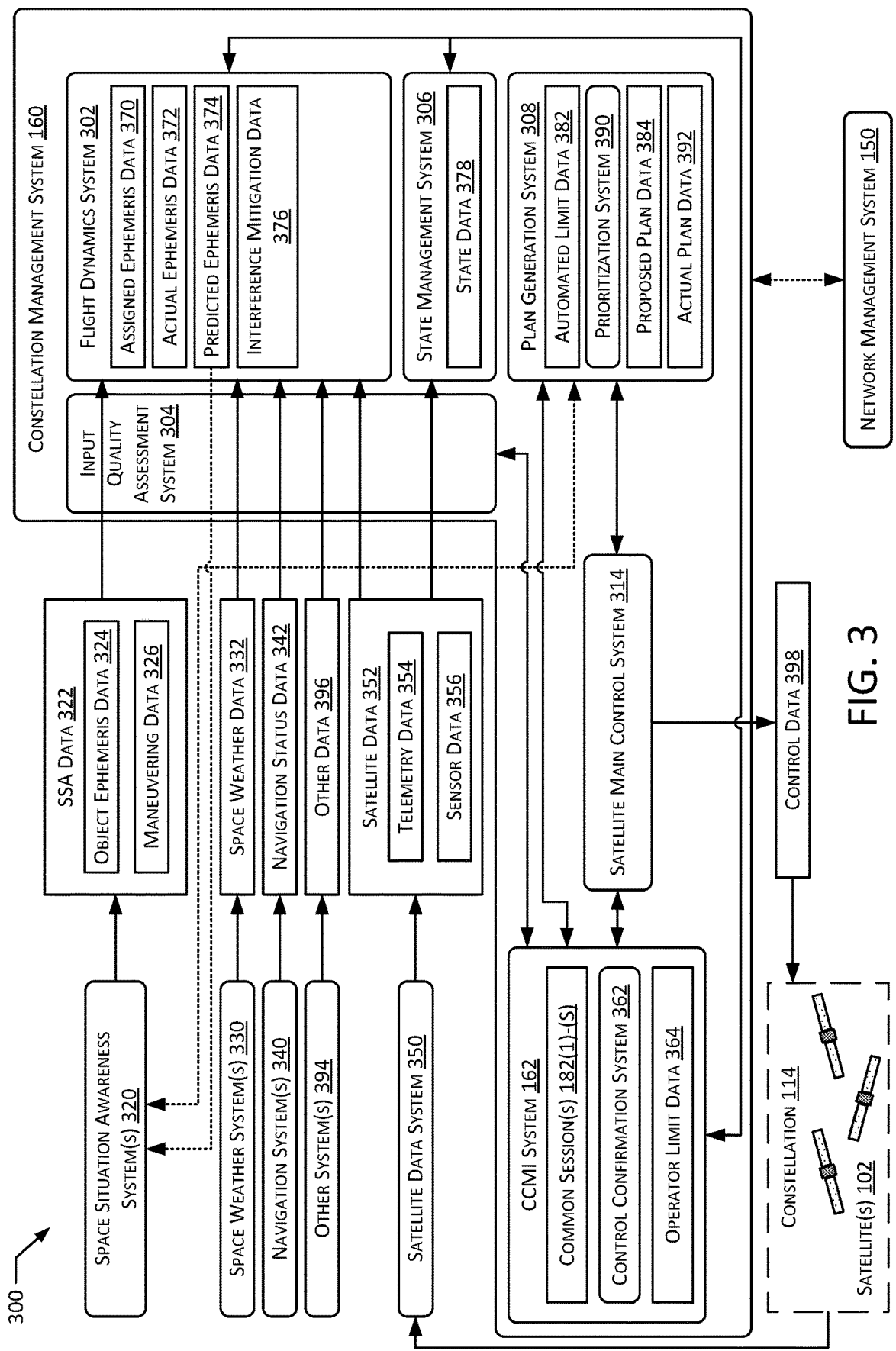
FIG. 3 illustrates the CMS and associated systems, according to some implementations.

FIG. 3 illustrates at 300 the CMS 160 with a CCMI system 162 and associated systems, according to some implementations. The CMS 160 may provide various services that include receiving information from external systems, providing information to those external systems, coordinating with those external systems, planning and initiating activities that include satellites 102 in the constellation 114, coordinating with the network management system 150 to facilitate operation of the payloads on the satellites 102, and so forth. The space environment is dynamic and complex, involving many factors that are outside of our daily experience here on Earth. One factor is the number of objects that are in orbit 104 around the Earth. There are over 25,000 objects in Earth orbit that are being tracked. These objects include active satellites, decommissioned satellites, expended rocket boosters, lost tools, and so forth. Some of these objects are under active control, such as satellites that have functional control and maneuvering systems, while other objects are no longer under active control.

Objects that are in orbit around a body such as the Earth experience a variety of effects that change or "perturb" their orbits. These effects are internal and external. Internal effects can include intentional maneuvers using devices such as thrusters, solar sails, interaction with Earth's magnetic field, and so forth. Internal effects can include outgassing, thermal radiation of satellite components, pressure vessel failures, battery failures, and so forth. External effects include interactions between the object and the various gravitational fields experienced in Earth orbit, Earth's atmosphere, Earth's magnetosphere, solar activity, collisions with other objects, and so forth.

The CMS 160 may include various systems, such as a flight dynamics system 302, an input quality assessment system 304, a state management system 306, a plan generation system 308, a satellite main control (SMC) system 314, the CCMI system 162, and so forth. The CMS 160 may also interact with the network management system 150.

The flight dynamics system (FDS) 302 acquires and processes information that affects the location of satellites 102 in the constellation 114. Ephemeris data comprises information about orbital elements that are descriptive of the orbit 104 of a particular object, such as a satellite 102. These orbital elements may include an epoch or reference time, distance of a semi-major axis, eccentricity, right ascension at reference time, and so forth. The FDS 302 may maintain one or more of assigned ephemeris data 370, actual ephemeris data 372, or predicted ephemeris data 374.

The assigned ephemeris data 370 is indicative of the orbital elements that a particular satellite 102 is assigned to maintain to within some threshold. The assigned ephemeris data 370 may be determined manually or automatically. For example, a human operator may specify a particular set of orbital elements that are assigned to the satellite 102. In another example, the FDS 302 may automatically determine the assigned ephemeris data 370 for a particular satellite.

The actual ephemeris data 372 is based on an actual location of the satellite 102. The actual ephemeris data 372 is indicative of a current or previous actual location of the satellite 102. For example, the actual ephemeris data 372 may be determined based on telemetry data 354 from the satellite 102 that comprises position data.

The predicted ephemeris data 374 is a prediction of what the orbital elements of the satellite 102 will be. The predicted ephemeris data 374 may be based on the effects of the various internal effects such as planned maneuvers, external effects such space weather and orbital perturbation models, and so forth.

The FDS 302 may determine interference mitigation data 376 that is indicative of potential interactions between a communication payload on a satellite 102 and other objects including other satellites 102 in the constellation 114. For example, the interference mitigation data 376 may be indicative of, for a specified time, a volume in space within which a radio frequency (RF) transmitted by a payload on a satellite 102 would exceed a specified threshold value. Continuing the example, the FDS 302 may generate interference mitigation data 376 that indicates an RF payload, or at least a portion thereof, of a particular satellite 102 should be deactivated during a specified time interval to avoid interfering with another satellite 102.

Various systems may interact with the CMS 160. One or more space situation awareness (SSA) systems 320 may provide SSA data 322 to the CMS 160. The SSA data 322 may comprise object ephemeris data 324, maneuvering data 326, and so forth. For example, the object ephemeris data 324 may comprise orbital two-line elements (TLE) data that may be used to determine a predicted location of an object in space. Continuing the example, the maneuvering data 326 may be indicative of planned or in-progress maneuvers that may change the motion of the object.

An SSA system 320 may be operated by governments, private companies, or other entities. For example, the United States Air Force (USAF) obtains tracking data using various radar and optical tracking resources. A portion of this data is available to others to facilitate orbital operations. For example, orbital elements for various objects in orbit 104 tracked by the USAF may be accessed online at space-track.org. In another example, private companies may generate SSA data 322. For example, commercial services providers may use data from ground based radar sites to generate object ephemeris data 324 for objects in orbit. In another example, operators of other constellations 114 may provide object ephemeris data 324 for satellites 102 under their control.

Space weather systems 330 provide space weather data 332 to the CMS 160. The space weather systems 330 may be operated by governments, private companies, or other entities. For example, the United States National Oceanic and Atmospheric Administration (NOAA) acquires data from various ground-based and satellite-based resources about the sun, Earth's upper atmosphere, Earth's magnetosphere, radiation belts, and so forth. For example, the space weather data 332 may provide information such as movement of the upper atmosphere, energetic particle flux, solar activity, location of the South Atlantic Anomaly, and so forth.

Space weather can substantially affect operation of satellites 102. For example, a coronal mass ejection (CME) from the sun may result in a substantial increase in charged particles that interfere with operation of electronic devices onboard satellites 102. In another example, changes in solar activity cause the atmosphere to change height, changing aerodynamic drag on satellites.

Navigation systems 340 comprising global navigation satellite systems (GNSS) may provide navigation status data 342 to the CMS 160. The navigation systems 340 may be operated by governments, private companies, or other entities. For example, the USAF operates the global positioning system (GPS), Russia operates the Global Navigation Satellite System (GLONASS), and so forth. The satellite portion of the navigation systems 340 is susceptible to the effects of space weather, may experience equipment failures, and so forth. Navigation status data 342 may provide information indicative of operation of the GNSS, accuracy data, correction factors, and so forth. For example, the navigation status data 342 may comprise information that indicates the accuracy of navigational signals provided for a particular volume of space at a particular time. The GNSS receiver onboard the satellites 102 may use signals from the navigation system 340 to determine position data for the satellites 102 in the constellation 114.

Other systems 394 may provide other data 396 to the CMS 160. In one implementation, the other systems 394 may include terrestrial weather data indicative of observed or forecasted terrestrial weather conditions. Terrestrial weather conditions may affect operations involving the satellites 102. For example, heavy precipitation in the atmosphere between the satellite 102 and a UT 108 may attenuate radio signals along a signal path, producing "rain fade". This attenuation may affect communication by resulting in reduced throughput, requiring additional transmit power, and so forth.

In some implementations, the data described herein as provided to the CMS 160 may be provided to the network management system 150. For example, the network management system 150 may use the terrestrial weather data to select which satellites 102 will be used to provide communication service to UTs 108 to minimize attenuation of radio signals along the signal path between a given satellite 102 and UT 108.

The network management system 150 may also provide information for the CMS 160. For example, the network management system 150 may provide information to the CMS 160 about system status data 154, geographic location of UTs 108, diagnostic data, and so forth. The CMS 160 may take this information into consideration while determining proposed plan data 384.

A satellite data system 350 provides satellite data 352 about the satellites 102 in the constellation 114. For example, the satellite data system 350 may receive satellite data 352 from satellites 102 via the ground stations 106. The satellite data 352 may comprise telemetry data 354, sensor data 356, and so forth. The telemetry data 354 may comprise information indicative of the operation of one or more devices onboard the satellite 102. For example, the telemetry data 354 may be indicative of battery charge, propellant quantity, and so forth. The sensor data 356 may comprise data obtained by one or more sensors. For example, the sensor data 356 may include position data obtained by the GNSS receiver. In another example, the sensor data 356 may comprise data indicative of objects detected by the radar.

The input quality assessment system 304 processes data ingested by the CMS 160 to assess the quality of the data. The input quality assessment system 304 determines quality based on comparisons between different sources of data, based on analysis relative to historical data, by comparing to predefined ranges, or using other techniques. For example, the CMS 160 may compare at least a portion of first object ephemeris data 324 received from a first SSA system 320 to second object ephemeris data 324 received from a second SSA system 320. If the comparison indicates a variation that exceeds a threshold amount, one or both of the first or second object ephemeris data 324 may be disregarded. Data that is determined to have quality less than a threshold may be discarded or flagged during subsequent processing by the CMS 160.

During operation, the FDS 302 may accept as input one or more of the SSA data 322, space weather data 332, navigation status data 342, satellite data 352, and so forth. For example, the FDS 302 may use the navigation status data 342 and the sensor data 356 to determine the actual ephemeris data 372 for a particular satellite 102. In another example, the FDS 302 may use the space weather data 332, and the actual ephemeris data 372 to determine the predicted ephemeris data 374.

The FDS 302 may use the SSA data 322 and the predicted ephemeris data 374 to determine if a conjunction event may occur. A conjunction event may be determined when the locations of a satellite 102 and another object are less than a threshold distance apart at a specified time. In some situations, a conjunction event may involve a collision between the satellite 102 and the object.

During operation, the FDS 302 may also send data to the SSA system(s) 320 or other operators of constellations 114. For example, the FDS 302 may send predicted ephemeris data 374 about the constellation 114 to the SSA system 320. This may reduce operational risks by providing an additional opportunity to determine possible conjunction events in advance. For example, the SSA system 320 may use the predicted ephemeris data 374 to produce an independent determination as to whether a conjunction event may occur. That determination may then be provided back to the CMS 160 or to other systems.

The state management system 306 may maintain state data 378 about satellites 102 in the constellation 114. The state data 378 may include information about the satellite 102, payload, and so forth.

In some implementations the state data 378 may include predicted data. For example, the state data 378 may include a prediction of remaining operational lifespan of a particular system onboard the satellite 102. The state management system 306 may determine predicted data using one or more of decision trees, heuristics, machine learning systems, and so forth. For example, the machine learning systems may comprise one or more neural networks. The one or more neural networks may be trained using satellite data 352 to determine a correspondence between particular inputs such as specific values of telemetry data 354 and later values. For example, telemetry data 354 from many satellites 102 may be acquired over time and used to predict performance of a particular system.

The plan generation system 308 interacts with the other systems and uses a prioritization system 390 to determine actual plan data 392 based on proposed plan data 384. The actual plan data 392 may comprise a satellite identifier, priority value indicative of priority of the plan, timing information, information about the systems on the satellite 102 used by the plan, and details about operating those systems. Data from other systems, such as from the FDS 302, the state management system 306, CCMI system 162, and so forth may result in determination of an event.

Responsive to the event, the plan generation system 308 determines one or more activities, and from those activities, the proposed plan data 384. For example, the prioritization system 390 may assess activity alternatives to determine the proposed plan data 384. The proposed plan data 384 may comprise the satellite identifier, priority value indicative of priority of the proposed plan, timing information, and so forth. The activities described in the proposed plan data 384 may be constrained by one or more values and may be specified by automated limit data 382. For example, the delta v indicated in the proposed plan data 384 for a maneuver generated automatically by the plan generation system 308 may be limited by values specified in the automated limit data 382. The proposed plan data 384 may be evaluated, and if approved, is used to determine actual plan data 392. For example, if values within the proposed plan data 384 are within the limits specified by the automated limit data 382, the proposed plan data 384 may be approved to use as actual plan data 392. In some situations, operator input may be received to confirm the use of the proposed plan data 384 as the actual plan data 392. For example, the proposed plan data 384 may be provided to the CCMI system 162 to receive user input via a user interface.

As mentioned above, the plan generation system 308 may take into consideration data from the network management system 150. For example, during maneuvers the satellite 102 may be unable to operate the payload to provide communication services to a UT 108. The proposed plan data 384 may specify maneuvers for a particular satellite 102 to take place while the satellite 102 is over a portion of the Earth that contains a low number of UTs 108 per area, to reduce the number of UTs 108 that would be affected by the reduction in available communication resources.

The actual plan data 392 may be passed to a satellite main control system 314. The satellite main control system 314 may perform one or more functions. In one implementation, the satellite main control system 314 may confirm that the actual plan data 392 would not result in an adverse event associated with the satellite 102. For example, the satellite main control system 314 may confirm that an operation involving an update to the onboard computer will not be executed while the satellite 102 is passing through the South Atlantic Anomaly that could result in an upset event to the onboard computer. The satellite main control system 314 may determine control data 398 comprising one or more commands for the satellite 102 to execute to implement the actual plan data 392. The satellite main control system 314 may send the control data 398 to the appropriate satellite 102. The satellite 102 then executes the one or more commands in the control data 398. For example, a tracking, telemetry, and control (TTC) ground station may be used to send the control data 398 to the satellite 102. The TTC system onboard the satellite 102 may receive and process the control data 398.

In some implementations, one or more of the functions described with respect to the plan generation system 308 may be performed at least in part by the SMC system 314. For example, the proposed plan data 384 may be passed to the SMC system 314 that then generates the actual plan data 392.

During operation, the plan generation system 308 may also send data to the SSA system(s) 320 or other operators of constellations 114. For example, the plan generation system 308 may send information about a proposed maneuver that is in proposed plan data 384 to the SSA system 320. This may reduce operational risks by providing an additional opportunity to determine possible conjunction events in advance. For example, the SSA system 320 may use the information about the proposed maneuver and other available information to produce an independent determination as to whether the maneuver is likely to result in a conjunction event. That determination may then be provided back to the plan generation system 308 in the CMS 160 or to other systems. For example, if the SSA 320 confirms the proposed maneuver is not likely to result in a conjunction event, the plan generation system 308 may generate actual plan data 392 that includes the proposed maneuver.

The CCMI system 162 provides functionality allowing operators, such as human operators or autonomous operators, to collaborate and interact with the other systems of the CMS 160 and external systems. For example, the CCMI system 162 provides a user interface for human operators to view common information, enter commands, and so forth. The operator may provide input via the user interface that indicates approval of proposed plan data 384, changes to the proposed plan data 384, and so forth. The CCMI system 162 may provide one or more "general oversight" common session(s) 182 that provides various functions such as a "dashboard" or overall status of the constellation 114. The common session(s) 182 may be used to facilitate monitoring larger scale operations, such as maneuvering a group of satellites 102.

The CCMI system 162 may include a control confirmation system 362. The control confirmation system 362 allows an operator to be introduced into the operational workflow. Operation of the CCMI system 162 may be constrained by operator limit data 364. The operator limit data 364 may specify thresholds as to what activities may be approved by a single operator, which activities require multiple operators, and so forth. For example, the control confirmation system 362 may require approval from two human operators to perform certain activities such as deorbiting a satellite 102.

In implementations where the constellation 114 provides communication services, the CMS 160 may interact with the network management system 150 that operates and manages the communication service and associated payload. For example, the FDS 302 may determine interference mitigation data 376 that, relative to a particular location to provide service on Earth, indicates satellite 102(1734) will be within the radio frequency (RF) volume produced by a transmitter on satellite 102(941). To avoid radio frequency interference, responsive to the interference mitigation data 376, the radio transmitter payload on satellite 102(941) may be turned off for the period that satellite 102(1734) will be within the volume.

In another example, some activities may result in a satellite 102 being unavailable to provide communication services. For example, while maneuvering the satellite 102 may be unable to provide communication services to UTs 108. The CMS 160 may provide information to the network management system 150 that is indicative of which satellites 102 are unavailable, and time intervals as to when those satellites 102 will be unavailable. For example, a common session 182 may include controls to allow operators to indicate that one or more satellites 102 will be unavailable for communication services during a specified interval. This information may then be provided to the network management system 150 to facilitate rerouting data to maintain communication service, where possible.

For ease of illustration, and not by way of limitation, various protocols to maintain security of the system 100 are not shown. For example, one or more cryptographic techniques may be used to secure the transfer of data between systems, to confirm the origin of data ingested into the CMS 160, authenticate and authorize operator sessions 180, and so forth.

The CMS 160 may utilize one or more of decision trees, heuristics, machine learning systems, or other techniques during operation. For example, the machine learning systems may comprise one or more neural networks. The one or more neural networks may be trained using data associated with operation of the system 100. For example, the plan generation system 308 may comprise a neural network that is trained at least in part using actual plan data 392 and associated input data to the CMS 160 that is associated with the determination of the actual plan data 392.

Figure 4:
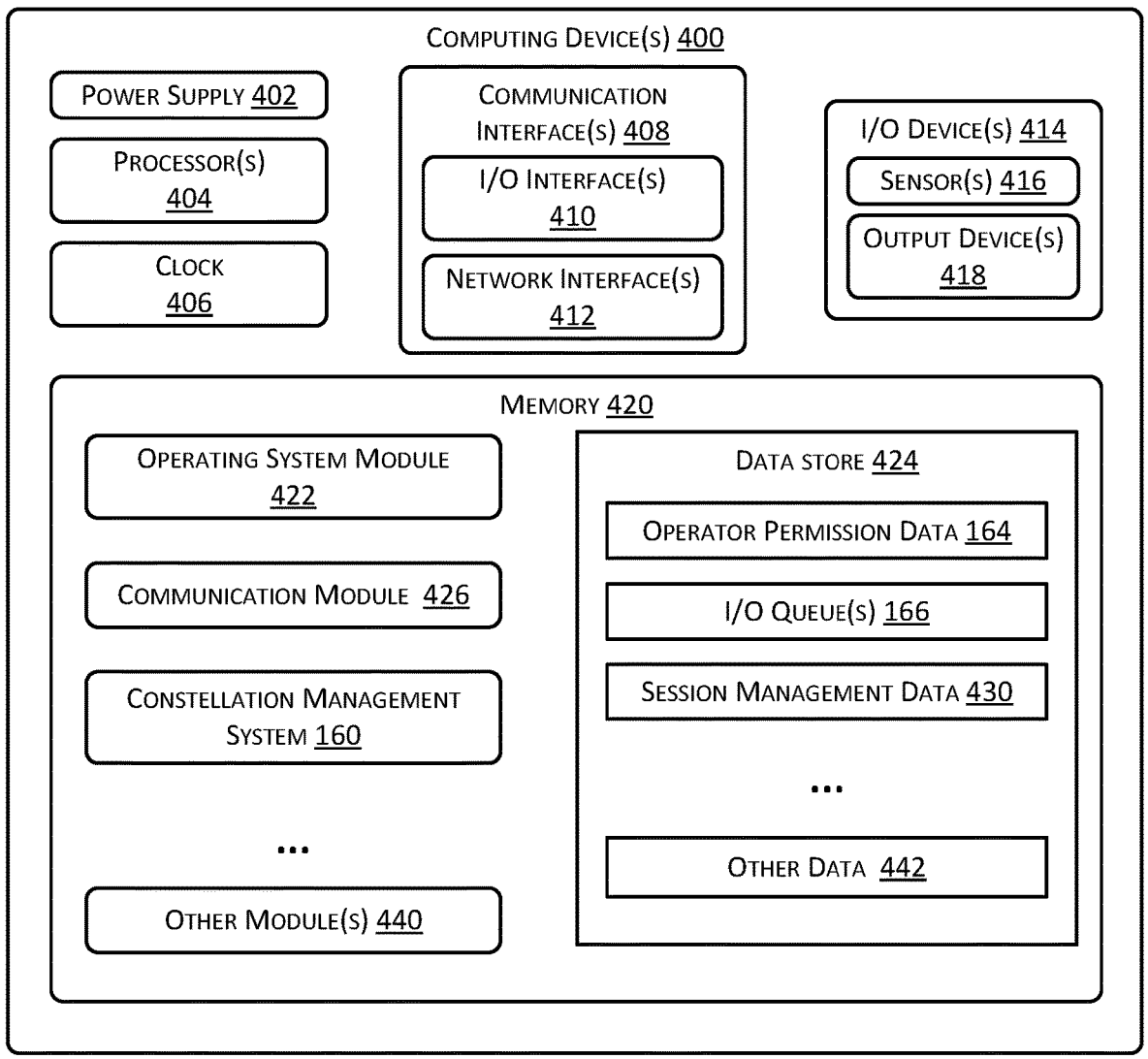
FIG. 4 is a block diagram of a computing device to implement the CCMI, according to some implementations.

FIG. 4 is a block diagram of a computing device 400 to implement the system 100 or portions thereof, according to some implementations. The computing device(s) 400 may comprise one or more servers, desktop computers, laptop computers, tablet devices, or other devices. The computing device(s) 400 may include "embedded systems", "on-demand computing", "software as a service (SaaS)", "platform computing", "network-accessible platform", "cloud services", "data centers", and so forth. Services provided by the computing device 400 may be distributed across one or more physical or virtual devices.

One or more power supplies 402 may be configured to provide electrical power suitable for operating the components in the computing device 400. The one or more power supplies 402 may comprise batteries, capacitors, fuel cells, photovoltaic cells, wireless power receivers, conductive couplings suitable for attachment to a power source such as provided by an electric utility, and so forth. The computing device 400 may include one or more hardware processors 404 (processors) configured to execute one or more stored instructions. The processors 404 may comprise one or more cores. One or more clocks 406 may provide information indicative of date, time, ticks, and so forth. For example, the processor 404 may use data from the clock 406 to determine timestamps associated with output data 192.

The computing device 400 may include one or more communication interfaces 408 such as input/output (I/O) interfaces 410, network interfaces 412, and so forth. The communication interfaces 408 enable the computing device 400, or components thereof, to communicate with other devices or components. The communication interfaces 408 may include one or more I/O interfaces 410. The I/O interfaces 410 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 410 may couple to one or more I/O devices 414. The I/O devices 414 may include input devices such as one or more of a sensor 416, keyboard, mouse, scanner, and so forth. The I/O devices 414 may also include output devices 418 such as one or more of a display device, printer, audio speakers, and so forth. In some embodiments, the I/O devices 414 may be physically incorporated with the computing device 400 or may be externally placed.

The network interfaces 412 may be configured to provide communications between the computing device 400 and other devices, such as routers, access points, and so forth. The network interfaces 412 may include devices configured to couple to personal area networks (PANS), local area networks (LANs), wireless local area networks (WLANS), wide area networks (WANs), and so forth. For example, the network interfaces 412 may include devices compatible with Ethernet, Wi-Fi, Bluetooth, and so forth.

The computing device 400 may also include one or more buses or other internal communications hardware or software that allow for the transfer of data between the various modules and components of the computing device 400.

As shown in FIG. 4, the computing device 400 includes one or more memories 420. The memory 420 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 420 provides storage of computer-readable instructions, data structures, program modules, and other data for the operation of the computing device 400. A few example functional modules are shown stored in the memory 420, although the same functionality may alternatively be implemented in hardware, firmware, or as a system on a chip (SoC).

The memory 420 may include at least one operating system (OS) module 422. The OS module 422 is configured to manage hardware resource devices such as the I/O interfaces 410, the I/O devices 414, the communication interfaces 408, and provide various services to applications or modules executing on the processors 404. The OS module 422 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

A communication module 426 may be configured to establish communications with the computing device 400, servers, other computing devices, or other devices. The communications may be authenticated, encrypted, and so forth.

Also stored in the memory 420 may be a data store 424 and one or more of the following modules. These modules may be executed as foreground applications, background tasks, daemons, and so forth. The data store 424 may use a flat file, database, linked list, tree, executable code, script, or other data structure to store information. In some implementations, the data store 424 or a portion of the data store 424 may be distributed across one or more other devices including other computing devices 106, network attached storage devices, and so forth.

The data store 424 may store one or more of the operator permission data 164, I/O queue(s) 166, session management data 430, and so forth. The memory 420 may store the CMS system 160. During operation of the CMS system 160 the session management data 430 may comprise information associated with the common sessions 182, operator sessions 180, and so forth. For example, the session management data 430 may maintain an association between a particular common session 182 and a particular operator session 180. Other modules 440 may also be present in the memory 420 as well as other data 442 in the data store 424.

The devices and techniques described in this disclosure may be used in a variety of other settings. For example, the system 100 may be used for other collaborative systems.

Figure 5:
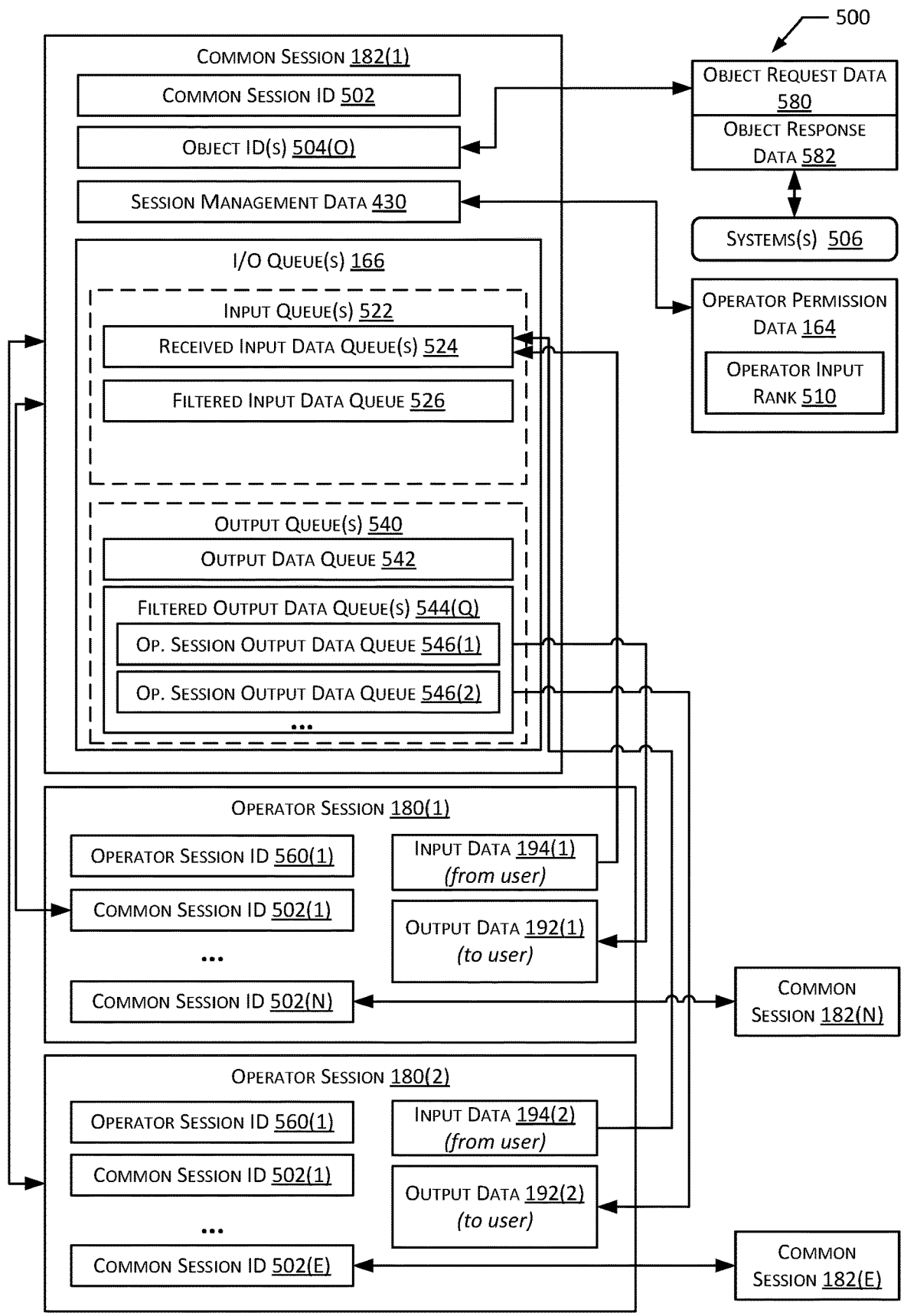
FIG. 5 illustrates information about a common session and operator sessions associated with the CCMI, according to some implementations.

FIG. 5 illustrates at 500 information about a common session 182 and operator sessions 180 associated with the CCMI system 162, according to some implementations.

A common session 182 may comprise a common session identifier (ID) 502. The common session ID 502 may be used to distinguish one common session 182 from another.

A common session 182 includes one or more object identifiers (IDs) 504(1), 504(2), ..., 504(0). An object ID 504 distinguishes one function from another in the CMS 160. The CCMI system 162 may send object request data 580 comprising the object ID 504 to another system 506. For example, first object request data 580 comprising a first object ID 504(1) that refers to an object to retrieve and present satellite propellant information may be sent to the state management system 306.

In some implementations, the CCMI system 162 may receive object response data 582 without sending object request data 580. For example, the flight dynamics system 302 may send unsolicited object request data 580 indicative of a conjunction event.

The object IDs 504 may be shared across the CCMI system 162. For example, the first common session 182(1) and the second common session 182(2) may both include the first object ID 504(1). The re-use of object ID(s) 504 across common sessions 182 may improve performance by reducing data transferred on a network, data processing, and so forth. For example, most recent object response data 582 that is associated with the first object ID 504(1) may be distributed to the common sessions 182 that include that object, rather than having each common session 182 send separate object request data 580 and receive separate object response data 582.

A common session 182 may include or be associated with the session management data 430. For example, the session management data 430 may comprise operator session IDs 560 that indicate which operator sessions 180 are participating in the common session 182. The session management data 430 may include, or be used in conjunction with, the operator permission data 164 to determine permissions associated with one or more the common session 182 or the participating operator sessions 180. For example, the session management data 430 may be indicative of the operator session IDs 560 and the associated operator account IDs. Based on the operator account IDs, specific permissions that may be deemed applicable to one or more of the common session 182 or the operator session 180 may be retrieved from the operator permission data 164. In another implementation, the operator permission data 164 may be associated with particular operator session IDs 560.

In some implementations the operator permission data 164 may comprise operator input rank 510 that specifies a rank associated with the input data 194 that is associated with a particular operator account or operator session 180. For example, some operator accounts may have a higher rank or priority relative to others. The input data 194 associated with the operator account that is more highly ranked may be processed, while the lower ranked input data 194 is disregarded. In some implementations, a time window or other interval may be considered as to whether to accept or disregard input data 194. For example, a time window of 300 milliseconds may be specified. If input data 194 associated with the same object ID 504 is received within the time window, the operator input rank 510 may be used to select one of the received inputs. In comparison, input data 194 arriving two seconds later from a lower ranked, but still permitted, operator session 180 may be accepted and processed.

The common session 182 may use one or more I/O queues 166 during operation. These may include one or more input queues 522 or one or more output queues 540.

The one or more input queues 522 may include one or more of a received input data queue 524, or a filtered input data queue 526. The received input data queue 524 may comprise the enqueued input data 194 received from any participating operator sessions 180. This may include input data 194 that is not permitted based on permissions, may be outranked as described above, and so forth.

The filtered input data queue 526 may comprise the received input data queue 524 after being filtered to remove impermissible inputs. For example, input data 194 from operator sessions 180 that do not have permission to operate the common session 182 may be disregarded and omitted from the filtered input data queue 526. In some implementations, the filtered input data queue 526 may deduplicate input data 194. For example, if the received input data queue 524 includes three entries of input data 194 that make the same change to the common session 182, the filtered input data queue 526 may have only a single entry of this input data 194. The filtered input data is enqueued for processing by the CCMI system 162 to operate the common session 182. Filtering of the input data 194 is discussed in more detail with respect to FIG. 6.

The one or more output queues 540 may include one or more of an output data queue 542 or filtered output data queues 544. The filtered output queue(s) 544 may comprise operator session output data queues 546.

During operation, the CCMI system 162 may determine output data 192. For example, a system 506 may send object response data 582 reporting a change to a satellite 102. The CCMI system 162 may process this object response data 582 and generate output data 192 that may be enqueued in the output data queue 542. In some implementations, timestamps may be added to the entries in the output data queue 542. For example, the timestamp may be indicative of the date/time that the entry was enqueued. In other implementations, a sequence number may be added to the entries in the output data queue 542.

In one implementation, the contents of the output data queue 542 may be sent to all participating operator sessions 180. In other implementations, the operator permission data 164 may be used to filter and distribute output data 192 or a portion thereof to particular operator sessions 180. In the implementation depicted here, each operator session 180 that is participating in the common session 182 is associated with an operator session output data queue 546. The output data 192, or portion thereof that is permitted to a particular operator session 180, may be enqueued to that particular operator session's 180 operator session output data queue 546. The entries in the enqueued operator session output data queue 546 may then be sent to the respective operator device 170 that has instantiated the operator session 180. The output data 192 may be configured to cause the operator device 170 to present a user interface that is representative of the common session 182.

In some implementations, the output filter module 640 (shown in FIG. 6), or the browser module 174 receiving the output data 192, may modify the output data 192. If an operator session 180 does not have permission to view a particular object 202 in the common session 182, the output filter module 640 may replace the portion of the first output data 192(1) with one or more of indicia indicating removal. For example, a limited permission object 204 may be replaced with a redacted representation 206. This allows the operator with insufficient permissions to be aware that there is information they are not permitted to view, which may facilitate communication.

In some implementations, the output filter module 640, or the browser module 174 receiving the output data 192, may modify one or more values in the output data 192. For example, the first operator using the first operator session 180(1) may have a preference to see cyan highlights instead of a default yellow highlight. As a result, the entries in the first operator session output data queue 546(1) associated with the first operator session 180(1) may replace the highlight values to produce a cyan highlight during presentation.

The output filter module 640 may discard entries from one or more operator session output data queues 546. For example, the output filter module 640 may have a maximum size and may implement a first-in-first-out (FIFO) handling of entries, discarding older entries as newer entries are enqueued in an operator session output data queue 546.

The output filter module 640 may also manage the operator session output data queue(s) 546 based at least in part on information received from the operator device(s) 170. For example, the operator device 170 may send to the CCMI 162 information such as packet acknowledgements, packet retry requests, and so forth. Connection performance statistics may be maintained that are indicative of the connection. For example, the connection performance statistics may indicate number of lost packets, number of retry requests, absence of expected packets such as a keepalive or heartbeat packet, and so forth. The output filter module 640 may determine what entries to enqueue in a particular operator session output data queue 546 based at least in part on the connection performance statistics. For example, the operator session output data queue 546 that is associated with an operator session 180 that is experiencing frequent retry requests, packet loss, and so forth may be maintained at a smaller size relative to other operator session output data queues 546. This may be done to minimize delays in updating the information for that operator session 180 should excessive retries or data loss during transmission take place.

The operator session 180 may comprise the operator session ID 560. The operator session ID 560 may be used to distinguish one operator session 180 from another.

The operator session 180 may comprise one or more common session IDs 502(1), 502(2), . . . , 502(N). As described above, an operator session 180 may participate in one or more common sessions 182.

The operator session 180 may include input data 194 that originates from the operator device 170 and is to be sent to the CCMI system 162. For example, the input data 194 may result from user input 208 acquired using an input device of the I/O devices 172 and processed by the browser module 174. The output data 192 is received from the CCMI system 162 and is processed by the browser module 174 to present output using an output device of the I/O devices 172.

Figure 6:
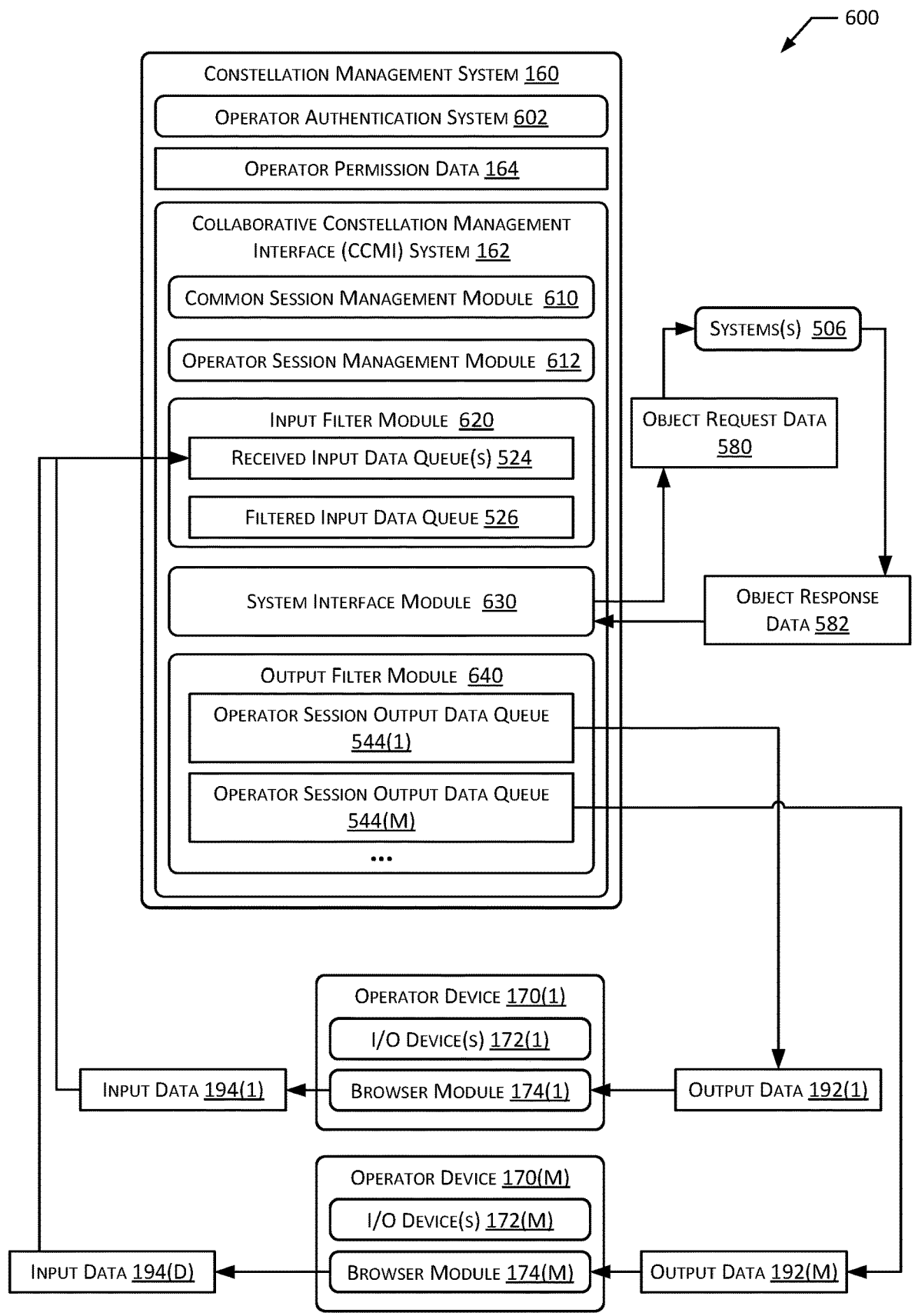
FIG. 6 is a block diagram of the CMS including the CCMI, according to some implementations.

FIG. 6 is a block diagram 600 of the CMS 160 including the CCMI system 162, according to some implementations. The CMS 160 may include or otherwise interact with an operator authentication system 602 that determines an operator account. The operator authentication system 602 may be used to authenticate one or more of an individual operator, an operator device 170, a browser module 174, an operator session 180, and so forth. An operator account may be asserted to the authenticated party. Based on the operator account, associated operator permission data 164 may be determined.

The CCMI system 162 may include one or more of a common session management module 610, an operator session management module 612, an input filter module 620, a system interface module 630, and an output filter module 640.

The common session management module 610 may maintain information about the common sessions 182, such as the common session ID 502, associated object IDs 504, session management data 430, and so forth. In some implementations, the common session management module 610 may determine if an operator session 180 has permission to participate in a common session 182.

The operator session management module 612 may maintain information about operator sessions 180. For example, the operator session management module 612 may terminate or send a reminder to operator sessions 180 that have sent no input data 194 for a threshold time, to remove unused operator sessions 180.

The input filter module 620 may enqueue received input data 194 from participating operator sessions 180 into the received input data queue(s) 524. The entries within the received input data queue(s) 524 are then processed to determine the entries within the filtered input data queue 526. Entries within the filtered input data queue 526 are then passed to the system interface module 630 for processing to operate the common session 182. Operation of the common session 182 may include, but is not limited to, one or more of adding an object ID 504 to the common session 182, removing an object ID 504 from the common session 182, entering or changing one or more values associated with an object ID 504 or operation thereof, and so forth.

In some implementations the input filter module 620 may implement a lock period or time interval during which at least some entries are not added to the filtered input data queue 526. In some implementations, these may comprise inputs associated with a particular operator session ID 560, a particular object ID 504, type of input, and so forth. For example, if the lock period is 100 milliseconds long and within the lock period 25 different inputs to the same object ID 504 are received, then an input may be enqueued in the filtered input data queue 526 and the other entries may be discarded. In another example, the type of input, such as entries associated with maneuvering a satellite 102, may be enqueued in the filtered input data queue 526 while entries that change presentation of data within the common session 182 may be limited to one entry per lock period. In other examples, other combinations of filtering, lock periods, and so forth may be used.

The system interface module 630 may perform various functions. The system interface module 630 may determine object request data 580. The object request data 580 may be determined based on expiration of a polling interval, responsive to input data 194 received in the filtered input data queue 526, and so forth. The object request data 580 may comprise one or more object IDs 504 and is sent to one or more systems 506.

The system interface module 630 may receive object response data 582. Based on the object response data 582 the system interface module 630 determines output data 192. The output data 192 may then be enqueued in the output data queue 542 for processing by the output filter module 640.

In some implementation, the CCMI system 162 may use a form of the model-view-viewmodel (MVVM) design pattern. With respect to this design pattern, the browser module 174 of the operator device 170 provides the "view" functions within the operator session 180, receiving operator input, presenting output to the operator, and so forth. In this respect, a thin presentation layer is implemented, as the browser module 174 executes relatively simple code. Continuing, with respect to the MVVM design pattern, the systems 506 perform the "model" functions, implementing specific logic, functions, data retrieval and so forth, without regard to how the resulting data is to be presented. The CCMI system 162, and in particular the system interface module 630, implement the "viewmodel" functions, providing manipulations to the data that facilitate presentation. The system interface module 630 provides data binding to the operator sessions 180, and interacts with the systems 506. The interaction between the system interface module 630 and other systems 506 may utilize object requests data 580 and object response data 582 as described above.

In some implementations, the system interface module 630 may provide other functions, such as number formatting, setting language preferences, defining layout of the user interface as presented in the common session 182, and so forth.

The system interface module 630 may determine output data 192. As described above, to provide access appropriate to the operator permission data 164, in one implementation at least a portion of the output data 192 that corresponds to the allowed permissions may be enqueued into the respective operator sessions output data queues 546. The entries within the operator session output data queues 546 may then be sent to the respective operator devices 170 for presentation by the browser modules 174.

In some implementations, the CCMI system 162 may utilize one or more techniques associated with the React/JSX user interface framework as promulgated at reactjs.org. For example, the output data 192 may comprise data that causes the operator device 170 to store data within the document object model (DOM) executing within a browser application. A change to the DOM subsequently causes a user interface to be rendered and presented by the operator device 170. For example, the output data 192 may add new elements to the DOM tree of the operator session 180 associated with the browser module 174. The rendering engine of the browser module 174 may detect the change and re-render the DOM tree, resulting in a change to the output presented on the display device. In other implementations, the re-rendering may occur without regard to change detection. For example, a rendering engine of the browser module 174 may process the DOM at specified time intervals.

By using the CCMI system 162, operators at different physical locations, with relatively simple operator devices 170, are able to collaboratively participate in management and operation of the constellation 114. The modular design allows for changes in the operation of the systems 506 to be made without necessarily breaking the system. Likewise, the presentation of the user interface presented in the common session 182 may be updated without affecting the underlying systems 506.

The CCMI system 162 also allows great flexibility with regard to presentation of information and collaboration, allowing an operator to use a single operator session 180 to participate in a plurality of different common sessions 182, improving access to information. The operator may also use many operator sessions 180, potentially with each showing different common sessions 182 and thus information.

The CCMI system 162 also facilitates review, training, and other purposes. For example, entries in the output data queue 542 may be timestamped. The output data queue 542, filtered output data queue 544, or specific operator session output data queue(s) 546, may be stored as session data for later use. In one implementation, the session data or a portion thereof may be replayed in a third operator session 180, allowing an operator to view the session including changes overtime. This replay would comprise sending the session data either in order of timestamps, or sending the session data and having the browser module 174 process the entries in the session data. The replay may be performed at normal speed, may be accelerated to shorten reply time, may be advanced manually, may step through entries at a fixed rate, and so forth.

In some implementations, timestamp data may be included in the output data 192. Session data may be stored that includes the output data 192 and the associated timestamps. This session data may then be "replayed" at a later time for assessment, training, or other purposes, presenting the output in a replay session in the order and timing of actual occurrence.

Figure 7:
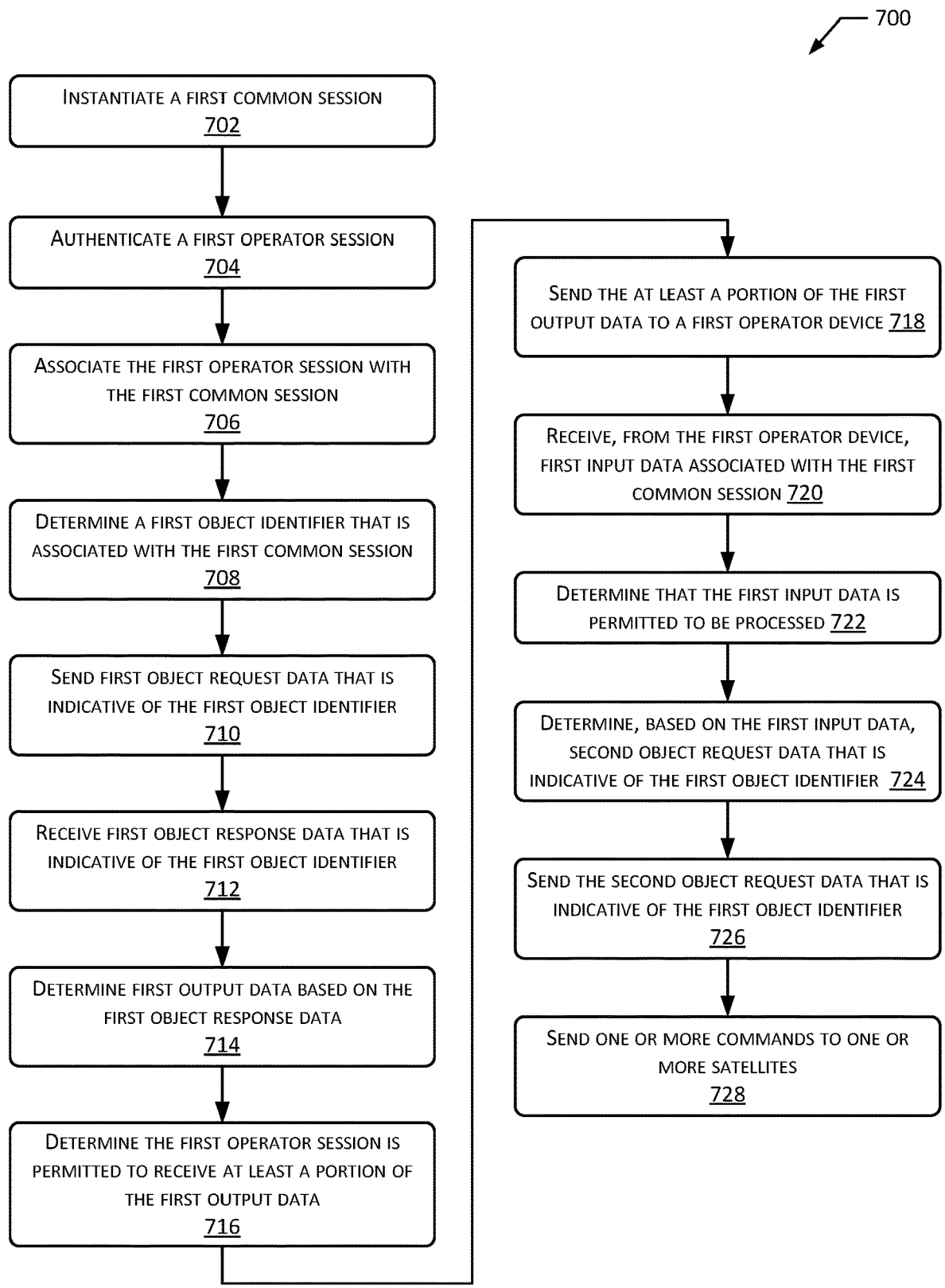
FIG. 7 is a flow diagram of a process to provide a collaborative interface for constellation management, according to some implementations.

FIG. 7 is a flow diagram at 700 of a process to provide a collaborative interface for constellation management, according to some implementations. The process may be implemented at least in part by the CMS 160.

At 702 a first common session 182(1) is instantiated. For example, the common session management module 610 may retrieve or generate a common session ID 502 and determine one or more object IDs 504 that are associated with the common session ID 502. During instantiation, compute resources may be allocated to the common session 182. For example, data structures may be initialized to serve as the I/O queues 166, operator permission data 164 that is associated with the common session 182 may be determined, and so forth.

At 704 a first operator session 180(1) is authenticated. For example, a first operator using the first operator device 170(1) to instantiate the first operator session 180(1) may be authenticated using multifactor authentication to determine an associated operator account that is permitted access to the CCMI system 162. The authentication may also include confirming that the first operator device 170(1) is authorized and is using a restricted network that is allowed to communicate with the CCMI system 162.

At 706 the first operator session 180(1) is associated with the first common session 182(2). For example, the operator session management module 612 may associate the operator session ID 560 with the common session ID 502.

At 708 a first object ID 504(1) is determined that is associated with the first common session 182(1). For example, during or after instantiation, one or more object IDs 504 may be retrieved based on the common session ID 502. The object ID 504 is associated with at least a portion of the systems 506 used to manage the constellation 114 of satellites 102. For example, the systems 506 may comprise the CMS 160, SSA systems 320, the satellite data system 350, the network management system 150, and so forth.

At 710 first object request data 580 is sent that is indicative of the first object ID 504(1). For example, the first object request data 580 may comprise an application programming interface (API) call or other mechanism that requests one or more of the systems 506 to perform one or more data processing functions.

In some implementations, the first object request data 580 may be determined by the system interface module 630. For example, the system interface module 630 may poll the object IDs 504 associated with a common session 182.

At 712 first object response data 582 is received that is indicative of the first object ID 504(1). For example, the system(s) 506 may return the first object response data 582 responsive to the API call.

At 714, first output data 192(1) is determined based on the first object response data 582. For example, the system interface module 630 may process the object response data 582, determine one or more values for one or more user interface elements, may reformat received values for presentation, and so forth.

At 716 a determination is made that the first operator session 180(1) is permitted to receive at least a portion of the first output data 192(1). For example, the output filter module 640 may determine that the first operator session 180(1) is permitted to receive the at least a first portion of the first output data 192(1), and determine that a second operator session 180(2) is permitted to receive at least a second portion of the first output data 192(1).

Continuing the example, the output filter module 640 may determine that, based on the operator permission data 164, the first operator session 180(1) is allowed unrestricted access to the first output data 192(1). The at least a portion of the first output data 192(1) may be enqueued in the first operator session output data queue 546(1) that is associated with the first operator session 180(1).

At 718 the at least a portion of the first output data 192(1) is sent to the first operator device 170(1) that is associated with the first operator session 180(1). For example, the enqueued entries in the first operator session output data queue 546(1) may be sent to the browser module 174(1) of the first operator device 170(1).

The at least a portion of the first output data 192(1) is received by the first operator device 170(1) and is used to update the presentation of output on the I/O device(s) 172(1) of the first operator device 170(1). For example, the at least a portion of the first output data 192(1) may be processed by the browser module 174(1) to update a DOM of a web browser instance. As a result of this update, the information included in the at least a portion of the first output data 192(1) may be presented on the display screen of the first operator device 170(1).

At 720 first input data 194 is received from the first operator session 180(1) that is associated with the first operator device 170(1). For example, the first input data 194 may comprise instructions to change one or more values associated with the objects 202 that are presented in the first common session 182(1). Continuing the example, the values may comprise an updated date range for a timeline of operations involving the constellation 114.

At 722 the first input data 194(1) is determined to be permitted to be processed. For example, the input filter module 620 may determine that the first operator session 180(1) has "modify" permission for the common session 182(1) and enqueues in the filtered input data queue 526 the instructions to change the one or more values associated with the objects 202 that are presented in the first common session 182(1).

In some implementations, the operator input rank 510 may be considered as mentioned with regard to FIG. 6. For example, the operator input rank 510 may indicate that input associated with a first operator session 180(1) is prioritized with respect to the input associated with a second operator session 180(2).

At 724 second object request data 580(2) is determined, based on the first input data 194(1). Continuing the earlier example, the system interface module 630 processes the entry in the filtered input data queue 526 and generates the second object request data 580(2). For example, the second object request data 580(2) may indicate the updated date range for the timeline of operations.

At 726 the second object request data 580(2) is sent. The second object request data 580(2) may be indicative of the first object ID 504(1). Similar to the earlier description, the second object response data 582(2) may be received responsive to the second object request data 580(2). The second object response data 582(2) may be processed by the system interface module 630 to determine second output data 192(2). The second output data 192(2) may then be delivered as described.

At 728 one or more commands are sent to one or more satellites 104 of the constellation 114. For example, second input data 194(2) may be received that accepts a proposed maneuvering plan for a satellite 102. Responsive to the second input data 194(2), the object request data 580 may initiate the process of sending the commands associated with the proposed maneuvering plan to the satellite 102.

Times, intervals, durations, and the like as used in this disclosure may be specified with respect to actual clock time, system time, system timing references, discrete timeslots, interval indicators, and so forth. For example, time ticks may be specified relative to an epoch that resets at 10-minute intervals. In another example, actual clock time obtained from the Global Position System or other precision timing system may be used.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
 a constellation of artificial satellites; and
 a computer system communicatively coupled to the constellation of the artificial satellites, the computer system to:
  instantiate a first common session;
  authenticate a first operator session to use the first common session;
  associate the first operator session with the first common session;
  authenticate a second operator session to use the first common session;
  associate the second operator session with the first common session;
  determine a first object identifier (ID) that is associated with the first common session;

send, to a first system associated with the first object ID, the first object ID;

receive first object response data corresponding to the first object ID;

determine first output data based on the first object response data;

send at least a first portion of the first output data to a first operator device that is associated with the first operator session; and send at least a second portion of the first output data to a second operator device that is associated with the second operator session.

2. The system of claim 1, the computer system further to:

determine that the first operator session is permitted to receive the at least a first portion of the first output data; and determine that the second operator session is permitted to receive the at least a second portion of the first output data.

3. The system of claim 1, the computer system further to:

receive first input data from the first operator device, wherein the first input data is associated with the first common session and the first operator session;

determine, based at least in part on the first input data, one or more commands; and send the one or more commands to one or more satellites in the constellation of the artificial satellites.

4. The system of claim 1, the computer system further to:

instantiate a second common session;

authenticate a third operator session to use the second common session;

determine that the first object ID is associated with the second common session; and send at least a third portion of the first output data to a third operator device that is associated with the third operator session.

5. The system of claim 1, the computer system further to:

receive first input data from the first operator device, wherein the first input data is associated with the first common session and the first operator session;

determine that the first operator session is permitted to operate the first common session; and operate the first common session based on the first input data.

6. The system of claim 1, the computer system further to:

receive first input data from the first operator device, wherein the first input data is associated with the first common session and the first operator session;

receive second input data from the second operator device, wherein the second input data is associated with the first common session and the second operator session;

determine input rank data that indicates input received from the first operator session is prioritized with respect to input from the second operator session; and operate the first common session based on the first input data.

7. The system of claim 1, the computer system further to:

determine a first timestamp that is associated with the first output data;

determine second output data that is associated with the first object ID;

determine a second timestamp that is associated with the second output data;

store session data comprising: the first output data, the first timestamp, the second output data, and the second timestamp;

receive a command to replay the session data in a third operator session; and send the session data to a third operator device that is associated with the third operator session.

8. A computer-implemented method of managing a constellation of artificial satellites, the method comprising:

instantiating a first common session;

associating a first operator session with the first common session;

associating a second operator session with the first common session;

associating a first object identifier (ID) with the first common session, wherein the first object ID is associated with a portion of a system to manage the constellation of artificial satellites;

sending the first object ID to the system;

receiving first object response data corresponding to the first object ID;

determining first output data based on the first object response data;

sending a first portion of the first output data to a first device associated with the first operator session, wherein the first portion is configured to cause the first device to present a first user interface representative of the first common session; and sending a second portion of the first output data to a second device associated with the second operator session, wherein the second portion is configured to cause the second device to present a second user interface representative of the first common session.

9. The computer-implemented method of claim 8, further comprising:

determining that the first operator session is permitted to receive the first portion of the first output data; and determining that the second operator session is permitted to receive the second portion of the first output data.

10. The computer-implemented method of claim 8, further comprising:

receiving first input data that is associated with the first common session and the first operator session;

determining a second object ID that is associated with the first input data;

determining, based at least in part on the first input data, first object request data that is indicative of the second object ID; and sending the first object request data, wherein the first object request data causes a command to be sent to an artificial satellite.

11. The computer-implemented method of claim 8, further comprising:

determining the first portion of the first output data based on one or more of:

removing a third portion of the first output data, removing the third portion of the first output data and replacing the third portion with indicia indicating removal, or changing a value of a user interface element of the first output data from a first value to a second value.

12. The computer-implemented method of claim 8, further comprising:

instantiating a second common session, wherein the first object ID is associated with the second common session.

13. The computer-implemented method of claim 8, further comprising:

receiving first input data that is associated with the first common session and the first operator session;

determining that the first operator session is permitted to operate the first common session; and operating the first common session based on the first input data.

14. The computer-implemented method of claim 8, further comprising:

receiving first input data that is associated with the first common session and the first operator session;

receiving second input data that is associated with the first common session and the second operator session;

determining input rank data that indicates input received from the first operator session is prioritized with respect to input from the second operator session; and operating the first common session based on the first input data.

15. The computer-implemented method of claim 8, further comprising:

determining a first timestamp that is associated with the first output data;

determining second output data that is associated with the first object ID;

determining a second timestamp that is associated with the second output data;

storing session data comprising: the first output data, the first timestamp, the second output data, and the second timestamp;

receiving a command to replay the session data; and sending the session data to a third device.

16. The computer-implemented method of claim 8, further comprising:

receiving first data that is indicative of the first object ID;

determining second output data based on the first data; and sending a first portion of the second output data to the first device associated with the first operator session.

17. A system comprising:

a constellation of artificial satellites; and a computer system to:

instantiate a first common session;

associate a first set of operator sessions with the first common session;

associate a first set of object identifiers (IDs) with the first common session, wherein at least a portion of the object IDs are associated with at least a portion of a system to manage the constellation of satellites;

send object request data, wherein the object request data is indicative of at least one object ID of the first set of object IDs;

receive object response data, wherein the object response data is indicative of the at least one object ID of the first set of object IDs;

determine first output data based on the object response data;

determine a first set of permissions associated with individual operator sessions of the first set of operator sessions;

determine, based on the first set of permissions, a first set of output data for the individual operator sessions;

send, to the first set of operator sessions, respective portions of the first set of output data, wherein the respective portions are configured to cause respective devices to present a respective user interface representative of the first common session;

receive first input data that is associated with a first operator session of the first set of operator sessions;

determine, based at least in part on the first input data, one or more commands; and send the one or more commands to one or more satellites in the constellation of artificial satellites.

18. The system of claim 17, the computer system further to:

determine that the first operator session is permitted to operate the first common session; and operate the first common session based on the first input data.

19. The system of claim 17, the computer system further to:

determine the first operator session of the first set of operator sessions has a first permission;

determine, based on the first permission, second output data based on one or more of:

removing a first portion of the first output data, or removing the first portion of the first output data and replacing the first portion with indicia indicating removal; and wherein the first set of output data comprises the second output data.

20. The system of claim 17, the computer system further to:

receive second input data that is associated with a second operator session of the first set of operator sessions;

determine input rank data that indicates input received from the first operator session is prioritized with respect to input from the second operator session; and operate the first common session based on the first input data.

* * * * *